(12) United States Patent
Parrelli

(10) Patent No.: US 9,151,967 B2
(45) Date of Patent: Oct. 6, 2015

(54) CONTACT LENSES

(71) Applicant: PARRELLI OPTICAL LLC, Danvers, MA (US)

(72) Inventor: Jonathan W. Parrelli, Danvers, MA (US)

(73) Assignee: Jonathan W. Parrelli, Danvers, MA (US)

( * ) Notice: Subject to any disclaimer, the term of this patent is extended or adjusted under 35 U.S.C. 154(b) by 133 days.

(21) Appl. No.: 13/897,667

(22) Filed: May 20, 2013

(65) Prior Publication Data

US 2013/0314662 A1 Nov. 28, 2013

Related U.S. Application Data

(60) Provisional application No. 61/651,070, filed on May 24, 2012.

(51) Int. Cl.
G02C 7/00 (2006.01)
G02C 7/02 (2006.01)
G02C 7/04 (2006.01)

(52) U.S. Cl.
CPC .............. *G02C 7/044* (2013.01); *G02C 7/027* (2013.01)

(58) Field of Classification Search
CPC .......... G02C 7/04; G02C 7/041; G02C 7/042; G02C 7/044
USPC ............... 351/159, 159.05, 159.06, 159.1, 351/159.11, 159.12, 159.13, 159.14, 159.2, 351/159.37
See application file for complete search history.

(56) References Cited

U.S. PATENT DOCUMENTS

2007/0296916 A1* 12/2007 Holden et al. ................ 351/161
2011/0149236 A1* 6/2011 Weeber ........................ 351/177

* cited by examiner

*Primary Examiner* — Thomas K Pham
*Assistant Examiner* — Sharrief Broome
(74) *Attorney, Agent, or Firm* — Yakov Sidorin; Quarles & Brady LLP

(57) ABSTRACT

A set of contact lenses having peripheral zones with optical power parameters determined in relation to the optical powers of the central portions of the lenses. In a specific embodiment, an optical parameter assigned to a given peripheral zone of a lens from the set represents a difference between an optical power of the lens in such peripheral zone and an optical power of the lens in the central portion. A method for determining optical parameters of such set of lenses and an apparatus implementing such determination based on imaging data acquired as a result of imaging an eye and generation of a representation of the lenses at least in part of such imaging data.

13 Claims, 12 Drawing Sheets

FIG. 3A

Lens 9.0 APS-1 (Steep2)

| | | | Main Lens Parms | | | | | | Multifocal | | | | PZ Transitions (D) | | | | | PZ Widths (mm) | | | | |
|---|---|---|---|---|---|---|---|---|---|---|---|---|---|---|---|---|---|---|---|---|---|---|
| FK | CPC | Rx | Base Curve | Ecc | Diam | POZ | CT | ET | Mat | ADD Label | ADD FOD | CDZ | PZ1 | PZ2 | PZ3 | PZ4 | PZ5 | PC1 | PC2 | PC3 | PC4 | PC5 |
| 40.00 | 39.99 | -2.00 | 8.44 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 41.00 | 41.01 | -2.00 | 8.23 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 41.75 | 41.77 | -2.00 | 8.08 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 42.50 | 42.51 | -2.00 | 7.94 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 43.00 | 42.99 | -3.00 | 7.85 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 43.50 | 43.49 | -3.00 | 7.76 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 44.00 | 44.00 | -3.00 | 7.67 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 44.50 | 44.53 | -3.00 | 7.58 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 45.00 | 45.00 | -3.00 | 7.50 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 45.75 | 45.73 | -4.00 | 7.38 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 46.50 | 46.49 | -4.00 | 7.26 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 47.50 | 47.47 | -4.00 | 7.11 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 48.25 | 48.21 | -4.00 | 7.00 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 49.00 | 48.98 | -4.00 | 6.89 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |
| 50.00 | 50.00 | -4.00 | 6.75 | 0.20 | 9.0 | 6.5 | 0.16 | 0.12 | Flosi | 2.00 | 2.75 | 3.10 | -0.50 | 0.50 | 1.00 | 1.75 | 2.50 | 0.25 | 0.25 | 0.25 | 0.25 | 0.25 |

Lens 9.0 APS-2 (Steep1)

| FK | CPC | Rx | Base Curve | Ecc | Diam | POZ | CT | ET | Mat | ADD Label | ADD FOD | CDZ | PZ1 | PZ2 | PZ3 | PZ4 | PZ5 | PC1 | PC2 | PC3 | PC4 | PC5 |
|---|---|---|---|---|---|---|---|---|---|---|---|---|---|---|---|---|---|---|---|---|---|---|
| 40.00 | 39.99 | -2.00 | 8.44 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 41.00 | 41.01 | -2.00 | 8.23 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 41.75 | 41.77 | -2.00 | 8.08 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 42.50 | 42.51 | -2.00 | 7.94 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 43.00 | 42.99 | -3.00 | 7.85 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 43.50 | 43.49 | -3.00 | 7.76 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 44.00 | 44.00 | -3.00 | 7.67 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 44.50 | 44.53 | -3.00 | 7.58 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 45.00 | 45.00 | -3.00 | 7.50 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 45.75 | 45.73 | -4.00 | 7.38 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 46.50 | 46.49 | -4.00 | 7.26 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 47.50 | 47.47 | -4.00 | 7.11 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 48.25 | 48.21 | -4.00 | 7.00 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 49.00 | 48.98 | -4.00 | 6.89 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |
| 50.00 | 50.00 | -4.00 | 6.75 | 0.20 | 9.0 | 6.5 | 0.16 | 0.12 | Flosi | 2.00 | 2.75 | 3.10 | -0.50 | 0.75 | 1.25 | 2.00 | 2.50 | 0.25 | 0.25 | 0.25 | 0.25 | 0.25 |

|  |  | Main Lens Parms | | | | | | | Multifocal | | | | PZ Transitions (D) | | | | | PZ Widths (mm) | | | | |
|---|---|---|---|---|---|---|---|---|---|---|---|---|---|---|---|---|---|---|---|---|---|---|
| FK | CPC | Rx | Base Curve | Ecc | Diam | POZ | CT | ET | Mat | ADD Label | ADD FOD | CDZ | PZ1 | PZ2 | PZ3 | PZ4 | PZ5 | PC1 | PC2 | PC3 | PC4 | PC5 |
| *Lens 9.0 APS-3 (STD)* | | | | | | | | | | | | | | | | | | | | | | |
| 40.00 | 39.99 | -2.00 | 8.44 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 41.00 | 41.01 | -2.00 | 8.23 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 41.75 | 41.77 | -2.00 | 8.08 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 42.50 | 42.51 | -2.00 | 7.94 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 43.00 | 42.99 | -3.00 | 7.85 | 0.20 | 9.0 | 6.5 | 0.16 | 0.12 | Fiosi | 2.00 | 2.75 | 3.10 | -0.50 | 1.00 | 1.25 | 2.25 | 2.50 | 0.25 | 0.25 | 0.25 | 0.25 | 0.25 |
| 43.50 | 43.49 | -3.00 | 7.76 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 44.00 | 44.00 | -3.00 | 7.67 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 44.50 | 44.53 | -3.00 | 7.58 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 45.00 | 45.00 | -3.00 | 7.50 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 45.75 | 45.73 | -3.00 | 7.38 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 46.50 | 46.49 | -4.00 | 7.26 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 47.50 | 47.47 | -4.00 | 7.11 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 48.25 | 48.21 | -4.00 | 7.00 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 49.00 | 48.98 | -4.00 | 6.89 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| 50.00 | 50.00 | -4.00 | 6.75 | 0.20 | 9.0 | 6.5 | 0.16 | 0.12 | Fiosi | 2.00 | 2.75 | 3.10 | -0.50 | 1.00 | 1.50 | 2.25 | 2.50 | 0.25 | 0.25 | 0.25 | 0.25 | 0.25 |
| *Lens 9.0 APS-4 (Flat)* | | | | | | | | | | | | | | | | | | | | | | |
| 40.00 | 39.99 | -2.00 | 8.44 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 41.00 | 41.01 | -2.00 | 8.23 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 41.75 | 41.77 | -2.00 | 8.08 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 42.50 | 42.51 | -2.00 | 7.94 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 43.00 | 42.99 | -3.00 | 7.85 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 43.50 | 43.49 | -3.00 | 7.76 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 44.00 | 44.00 | -3.00 | 7.67 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 44.50 | 44.53 | -3.00 | 7.58 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 45.00 | 45.00 | -3.00 | 7.50 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 45.75 | 45.73 | -3.00 | 7.38 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 46.50 | 46.49 | -4.00 | 7.26 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 47.50 | 47.47 | -4.00 | 7.11 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 48.25 | 48.21 | -4.00 | 7.00 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 49.00 | 48.98 | -4.00 | 6.89 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |
| 50.00 | 50.00 | -4.00 | 6.75 | 0.20 | 9.0 | 6.5 | 0.16 | 0.12 | Fiosi | 2.00 | 2.75 | 3.10 | -0.50 | 1.25 | 1.75 | 2.50 | 2.50 | 0.25 | 0.25 | 0.25 | 0.25 | 0.25 |

FIG. 3B

| | | | Main Lens Parms | | | | | Multifocal | | | PZ Transitions (D) | | | | | PZ Widths (mm) | | | | |
|---|---|---|---|---|---|---|---|---|---|---|---|---|---|---|---|---|---|---|---|---|
| FK | CPC | Rx | Base Curve | Ecc | Diam | POZ | CT | ET | Mat | ADD Label | ADD FOD | CDZ | PZ1 | PZ2 | PZ3 | PZ4 | PZ5 | PC1 | PC2 | PC3 | PC4 | PC5 |
| Lens 9.0 APS-5 (Flat2) | | | | | | | | | | | | | | | | | | | | | | |
| 40.00 | 39.99 | -2.00 | 8.44 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 41.00 | 41.01 | -2.00 | 8.23 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 41.75 | 41.77 | -2.00 | 8.08 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 42.50 | 42.51 | -2.00 | 7.94 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 43.00 | 42.99 | -3.00 | 7.85 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 43.50 | 43.49 | -3.00 | 7.76 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 44.00 | 44.00 | -3.00 | 7.67 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 44.50 | 44.53 | -3.00 | 7.58 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 45.00 | 45.00 | -3.00 | 7.50 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 45.75 | 45.73 | -4.00 | 7.38 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 46.50 | 46.49 | -4.00 | 7.26 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 47.50 | 47.47 | -4.00 | 7.11 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 48.25 | 48.21 | -4.00 | 7.00 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 49.00 | 48.98 | -4.00 | 6.89 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| 50.00 | 50.00 | -4.00 | 6.75 | 0.20 | 9.0 | 6.5 | 0.16 | 0.12 | Fiosi | 2.00 | 2.75 | 3.10 | -0.50 | 1.50 | 2.00 | 2.75 | 2.50 | 0.25 | 0.25 | 0.25 | 0.25 | 0.25 |
| Lens 9.5 APS-1 (Steep2) | | | | | | | | | | | | | | | | | | | | | | |
| 40.00 | 39.99 | -2.00 | 8.44 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 41.00 | 41.01 | -2.00 | 8.23 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 41.75 | 41.77 | -2.00 | 8.08 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 42.50 | 42.53 | -2.00 | 7.94 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 43.00 | 42.99 | -3.00 | 7.85 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 43.50 | 43.49 | -3.00 | 7.76 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 44.00 | 44.00 | -3.00 | 7.67 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 44.50 | 44.53 | -3.00 | 7.58 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 45.00 | 45.00 | -3.00 | 7.50 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 45.75 | 45.73 | -4.00 | 7.38 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 46.50 | 46.49 | -4.00 | 7.26 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 47.50 | 47.47 | -4.00 | 7.11 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 48.25 | 48.21 | -4.00 | 7.00 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 49.00 | 48.98 | -4.00 | 6.89 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |
| 50.00 | 50.00 | -4.00 | 6.75 | 0.20 | 9.5 | 6.5 | 0.16 | 0.12 | Fiosi | 2.00 | 2.75 | 3.10 | -0.50 | 0.50 | 1.00 | 1.75 | 2.50 | 0.30 | 0.30 | 0.30 | 0.30 | 0.30 |

FIG. 3C

| | Main Lens Parms | | | | | | | | | Multifocal | | | PZ Transitions (Dj) | | | | | PZ Widths (mm) | | | | |
|---|---|---|---|---|---|---|---|---|---|---|---|---|---|---|---|---|---|---|---|---|---|---|
| FK | CPC | Rx | Base Curve | Ecc | Diam | POZ | CT | ET | Matt | ADD Label | ADD FOD | CDZ | PZ1 | PZ2 | PZ3 | PZ4 | PZ5 | PC1 | PC2 | PC3 | PC4 | PC5 |
| *Lens 9.5 APS-2 (Steep1)* | | | | | | | | | | | | | | | | | | | | | | |
| 40.00 | 39.99 | -2.00 | 8.44 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 41.00 | 41.01 | -2.00 | 8.23 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 41.75 | 41.77 | -2.00 | 8.08 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 42.50 | 42.51 | -2.00 | 7.94 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 43.00 | 42.99 | -3.00 | 7.85 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 43.50 | 43.49 | -3.00 | 7.76 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 44.00 | 44.00 | -3.00 | 7.67 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 44.50 | 44.53 | -3.00 | 7.58 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 45.00 | 45.00 | -3.00 | 7.50 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 45.75 | 45.73 | -4.00 | 7.38 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 46.50 | 46.49 | -4.00 | 7.26 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 47.50 | 47.47 | -4.00 | 7.11 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 48.25 | 48.21 | -4.00 | 7.00 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 49.00 | 48.98 | -4.00 | 6.89 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| 50.00 | 50.00 | -4.00 | 6.75 | 0.20 | 9.5 | 6.5 | 0.16 | 0.12 | Fiosi | 2.00 | 2.75 | 3.10 | -0.50 | 0.75 | 1.25 | 2.00 | 2.50 | 0.30 | 0.30 | 0.30 | 0.30 | 0.30 |
| *Lens 9.5 APS-3 (STD)* | | | | | | | | | | | | | | | | | | | | | | |
| 40.00 | 39.99 | -2.00 | 8.44 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 41.00 | 41.01 | -2.00 | 8.23 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 41.75 | 41.77 | -2.00 | 8.08 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 42.50 | 42.51 | -2.00 | 7.94 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 43.00 | 42.99 | -3.00 | 7.85 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 43.50 | 43.49 | -3.00 | 7.76 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 44.00 | 44.00 | -3.00 | 7.67 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 44.50 | 44.53 | -3.00 | 7.58 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 45.00 | 45.00 | -3.00 | 7.50 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 45.75 | 45.73 | -4.00 | 7.38 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 46.50 | 46.49 | -4.00 | 7.26 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 47.50 | 47.47 | -4.00 | 7.11 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 48.25 | 48.21 | -4.00 | 7.00 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 49.00 | 48.98 | -4.00 | 6.89 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |
| 50.00 | 50.00 | -4.00 | 6.75 | 0.20 | 9.5 | 6.5 | 0.16 | 0.12 | Fiosi | 2.00 | 2.75 | 3.10 | -0.50 | 1.00 | 1.50 | 2.25 | 2.50 | 0.30 | 0.30 | 0.30 | 0.30 | 0.30 |

FIG. 3D

Lens 9.5 APS-4 (Flat1)

| FK | CPC | Rx | Base Curve | Ecc | Diam | POZ | CT | ET | Mat | ADD Label | ADD FOD | CDZ | PZ1 | PZ2 | PZ3 | PZ4 | PZ5 | PC1 | PC2 | PC3 | PC4 | PC5 |
|---|---|---|---|---|---|---|---|---|---|---|---|---|---|---|---|---|---|---|---|---|---|---|
| 40.00 | 39.99 | -2.00 | 8.42 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 41.00 | 41.01 | -2.00 | 8.23 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 41.75 | 41.77 | -2.00 | 8.08 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 42.50 | 42.51 | -2.00 | 7.94 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 43.00 | 42.99 | -3.00 | 7.85 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 43.50 | 43.49 | -3.00 | 7.76 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 44.00 | 44.00 | -3.00 | 7.67 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 44.50 | 44.53 | -3.00 | 7.58 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 45.00 | 45.00 | -3.00 | 7.50 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 45.75 | 45.73 | -4.00 | 7.38 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 46.50 | 46.49 | -4.00 | 7.26 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 47.50 | 47.47 | -4.00 | 7.11 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 48.25 | 48.21 | -4.00 | 7.00 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 49.00 | 48.98 | -4.00 | 6.89 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |
| 50.00 | 50.00 | -4.00 | 6.75 | 0.20 | 9.5 | 6.5 | 0.16 | 0.12 | Fiosi | 2.00 | 2.75 | 3.10 | -0.50 | 1.25 | 1.75 | 2.50 | 2.50 | 0.30 | 0.30 | 0.30 | 0.30 | 0.30 |

Lens 9.5 APS-5 (Flat2)

| FK | CPC | Rx | Base Curve | Ecc | Diam | POZ | CT | ET | Mat | ADD Label | ADD FOD | CDZ | PZ1 | PZ2 | PZ3 | PZ4 | PZ5 | PC1 | PC2 | PC3 | PC4 | PC5 |
|---|---|---|---|---|---|---|---|---|---|---|---|---|---|---|---|---|---|---|---|---|---|---|
| 40.00 | 39.99 | -2.00 | 8.44 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 41.00 | 41.01 | -2.00 | 8.23 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 41.75 | 41.77 | -2.00 | 8.08 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 42.50 | 42.51 | -2.00 | 7.94 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 43.00 | 42.99 | -3.00 | 7.85 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 43.50 | 43.49 | -3.00 | 7.76 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 44.00 | 44.00 | -3.00 | 7.67 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 44.50 | 44.53 | -3.00 | 7.58 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 45.00 | 45.00 | -3.00 | 7.50 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 45.75 | 45.73 | -4.00 | 7.38 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 46.50 | 46.49 | -4.00 | 7.26 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 47.50 | 47.47 | -4.00 | 7.11 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 48.25 | 48.21 | -4.00 | 7.00 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 49.00 | 48.98 | -4.00 | 6.89 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |
| 50.00 | 50.00 | -4.00 | 6.75 | 0.20 | 9.5 | 6.5 | 0.16 | 0.12 | Fiosi | 2.00 | 2.75 | 3.10 | -0.50 | 1.50 | 2.00 | 2.75 | 2.50 | 0.30 | 0.30 | 0.30 | 0.30 | 0.30 |

FIG. 3E

| | | | Main Lens Parms | | | | | | Multifocal | | | PZ Transitions (D) | | | | | PZ Widths (mm) | | | | |
|---|---|---|---|---|---|---|---|---|---|---|---|---|---|---|---|---|---|---|---|---|---|
| FK | CPC | Rx | Base Curve | Ecc | Diam | POZ | CT | ET | Mat | ADD Label | ADD FOD | CDZ | PZ1 | PZ2 | PZ3 | PZ4 | PZ5 | PC1 | PC2 | PC3 | PC4 | PC5 |
| Lens 10.0 APS-1 (Steep2) | | | | | | | | | | | | | | | | | | | | | | |
| 40.00 | 39.99 | -2.00 | 8.44 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 41.00 | 41.01 | -2.00 | 8.23 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 41.75 | 41.77 | -2.00 | 8.08 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 42.50 | 42.51 | -2.00 | 7.94 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 43.00 | 42.99 | -3.00 | 7.85 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 43.50 | 43.49 | -3.00 | 7.76 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 44.00 | 44.00 | -3.00 | 7.67 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 44.50 | 44.53 | -3.00 | 7.58 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 45.00 | 45.00 | -3.00 | 7.50 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 45.75 | 45.73 | -4.00 | 7.38 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 46.50 | 46.49 | -4.00 | 7.26 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 47.50 | 47.47 | -4.00 | 7.11 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 48.25 | 48.21 | -4.00 | 7.00 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 49.00 | 48.98 | -4.00 | 6.89 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| 50.00 | 50.00 | -4.00 | 6.75 | 0.20 | 10.0 | 6.5 | 0.16 | 0.12 | Flosi | 2.00 | 2.75 | 3.10 | -0.50 | 0.50 | 1.00 | 1.75 | 2.50 | 0.35 | 0.35 | 0.35 | 0.35 | 0.35 |
| Lens 10.0 APS-2 (Steep1) | | | | | | | | | | | | | | | | | | | | | | |
| 40.00 | 39.99 | -2.00 | 8.44 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 41.00 | 41.01 | -2.00 | 8.23 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 41.75 | 41.77 | -2.00 | 8.08 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 42.50 | 42.51 | -2.00 | 7.94 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 43.00 | 42.99 | -3.00 | 7.85 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 43.50 | 43.49 | -3.00 | 7.76 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 44.00 | 44.00 | -3.00 | 7.67 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 44.50 | 44.53 | -3.00 | 7.58 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 45.00 | 45.00 | -3.00 | 7.50 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 45.75 | 45.73 | -4.00 | 7.38 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 46.50 | 46.49 | -4.00 | 7.26 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 47.50 | 47.47 | -4.00 | 7.11 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 48.25 | 48.21 | -4.00 | 7.00 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 49.00 | 48.98 | -4.00 | 6.89 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |
| 50.00 | 50.00 | -4.00 | 6.75 | 0.20 | 10.0 | 6.5 | 0.16 | 0.12 | Flosi | 2.00 | 2.75 | 3.10 | -0.50 | 0.75 | 1.25 | 2.00 | 2.50 | 0.35 | 0.35 | 0.35 | 0.35 | 0.35 |

| | | | Main Lens Parms | | | | | | Multifocal | | | PZ Transitions (D) | | | | | PZ Widths (mm) | | | | |
|---|---|---|---|---|---|---|---|---|---|---|---|---|---|---|---|---|---|---|---|---|---|
| FK | CPC | Rx | Base Curve | Ecc | Diam | PCZ | CT | ET | Mat | ADD Label | ADD FOD | CDZ | PZ1 | PZ2 | PZ3 | PZ4 | PZ5 | PC1 | PC2 | PC3 | PC4 | PC5 |

Lens 10.0 APS-3 (STD)

| 40.00 | 39.99 | -2.00 | 8.44 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 41.00 | 41.01 | -2.00 | 8.23 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 41.75 | 41.77 | -2.00 | 8.08 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 42.50 | 42.51 | -2.00 | 7.94 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 43.00 | 42.99 | -3.00 | 7.85 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 43.50 | 43.49 | -3.00 | 7.76 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 44.00 | 44.00 | -3.00 | 7.67 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 44.50 | 44.53 | -3.00 | 7.58 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 45.00 | 45.00 | -3.00 | 7.50 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 45.75 | 45.73 | -4.00 | 7.38 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 46.50 | 46.49 | -4.00 | 7.26 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 47.50 | 47.47 | -4.00 | 7.11 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 48.25 | 48.21 | -4.00 | 7.00 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 49.00 | 48.98 | -4.00 | 6.89 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |
| 50.00 | 50.00 | -4.00 | 6.75 | 0.20 | 10.0 | 6.5 | 0.16 | 0.12 | Fiosi | 2.00 | 2.75 | 3.10 | -0.50 | 1.00 | 1.50 | 2.25 | 2.50 | 0.35 | 0.35 | 0.35 | 0.35 | 0.35 |

Lens 10.0 APS-4 (Flat1)

| 40.00 | 39.99 | -2.00 | 8.44 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 41.00 | 41.01 | -2.00 | 8.23 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 41.75 | 41.77 | -2.00 | 8.08 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 42.50 | 42.51 | -2.00 | 7.94 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 43.00 | 42.99 | -3.00 | 7.85 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 43.50 | 43.49 | -3.00 | 7.76 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 44.00 | 44.00 | -3.00 | 7.67 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 44.50 | 44.53 | -3.00 | 7.58 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 45.00 | 45.00 | -3.00 | 7.50 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 45.75 | 45.73 | -4.00 | 7.38 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 46.50 | 46.49 | -4.00 | 7.26 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 47.50 | 47.47 | -4.00 | 7.11 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 48.25 | 48.21 | -4.00 | 7.00 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 49.00 | 48.98 | -4.00 | 6.89 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |
| 50.00 | 50.00 | -4.00 | 6.75 | 0.20 | 10.0 | 6.5 | 0.16 | 0.12 | Fiosi | 2.00 | 2.75 | 3.10 | -0.50 | 1.25 | 1.75 | 2.50 | 2.50 | 0.35 | 0.35 | 0.35 | 0.35 | 0.35 |

| | | | Main Lens Parms | | | | | | Multifocal | | | PZ Transitions (D) | | | | | PZ Widths (mm) | | | | |
|---|---|---|---|---|---|---|---|---|---|---|---|---|---|---|---|---|---|---|---|---|---|
| FK | CPC | Rx | Base Curve | Ecc | Diam | PQZ | CT | ET | Mat | ADD Label | ADD FGD | CDZ | PZ1 | PZ2 | PZ3 | PZ4 | PZ5 | PC1 | PC2 | PC3 | PC4 | PC5 |
| | | | Lens 10.0 APS-5 (Flat2) | | | | | | | | | | | | | | | | | | | |
| 40.00 | 39.99 | -2.00 | 8.44 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 41.00 | 41.01 | -2.00 | 8.23 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 41.75 | 41.77 | -2.00 | 8.08 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 42.50 | 42.51 | -2.00 | 7.94 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 43.00 | 42.99 | -3.00 | 7.85 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 43.50 | 43.49 | -3.00 | 7.76 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 44.00 | 44.00 | -3.00 | 7.67 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 44.50 | 44.53 | -3.00 | 7.58 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 45.00 | 45.00 | -3.00 | 7.50 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 45.75 | 45.73 | -4.00 | 7.38 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 46.50 | 46.49 | -4.00 | 7.26 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 47.50 | 47.47 | -4.00 | 7.11 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 48.25 | 48.21 | -4.00 | 7.00 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 49.00 | 48.98 | -4.00 | 6.89 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |
| 50.00 | 50.00 | -4.00 | 6.75 | 0.20 | 10.0 | 6.5 | 0.16 | 0.12 | Fiosi | 2.00 | 2.75 | 3.10 | -0.50 | 1.50 | 2.00 | 2.75 | 2.50 | 0.35 | 0.35 | 0.35 | 0.35 | 0.35 |

FIG. 3H

CONTACT LENSES

CROSS-REFERENCE TO RELATED APPLICATIONS

The present application claims benefit of and priority from the U.S. Provisional Patent Application No. 61/651,070 filed on May 24, 2012 and titled "Contact lenses". The entire disclosure of this provisional application is incorporated by reference herein for all purposes.

TECHNICAL FIELD

The present invention relates generally to contact lenses, and, in particular, to a set of parametrically-described fitting contact lenses and method(s) of fitting of such lenses to patients.

SUMMARY OF THE INVENTION

Embodiments of the invention provide a set of contact lenses. Each lens in such set has a differentiable posterior surface that includes a substantially circular posterior optical zone (POZ), which is characterized by a POZ-diameter and an optical power of the lens corresponding to the POZ, and at least three peripheral zones (PZs) each of which encircles said POZ and has corresponding inner and outer perimeters and a width. The immediately adjacent PZs share a perimeter. The first PZ that adjoins the POZ is characterized by a first optical power parameter. The second PZ, which has the largest outer perimeter among the three PZs, is characterized by a second optical power parameter. The third PZ, which is located between the first and second PZs, is characterized by a third optical power parameter. Each of the first, second, and third optical power parameters wherein each of the first, second, and third optical power parameters represents a difference between an optical power of the lens in a respectively corresponding PZ and the optical power of the lens corresponding to the POZ. In one embodiment, the first, second, and third optical power parameters are determined based on empirically acquired data base. In a specific implementation, the first and second optical power parameters have opposite signs and, optionally, the first and third optical power parameters have opposite signs. Alternatively or in addition, the PZs of the lens have equal widths and/or third optical power parameters of lenses in the set differ from one another by a constant.

In a related embodiment, the PZs of each lens in the set are annular and coaxial about the normal drawn to the posterior surface, of the corresponding lens, at the center of such posterior surface. The optical power corresponding to the POZ of a lens in the set may be the same for each lens in the set. Alternatively or in addition, each lens in the set is further characterized by at least one of a lens diameter and a diameter of the POZ that is common for all lenses in the set. In a specific case, each lens in the set is further characterized by a center thickness (defined along the normal drawn to the corresponding posterior surface at the center of such surface) and an edge thickness defined at the lens diameter, and all of the lenses in the set have the same central thickness and edge thickness values.

In a related implementation, a lens from the set of lenses includes five PZs such that the optical power parameters corresponding to the PZs that are interposed between the first and second PZs and have progressively larger outer perimeters form an ascending set of values. Optionally, each lens in the set further has a non-zero eccentricity. A related embodiment provides a method for using a contact lens from a set of contact lenses described above, the method comprising receiving said contact lens and fitting said contact lens to an eye.

Embodiments of the invention further provide a set of contact lenses, each lens in which has a differentiable posterior surface including a posterior optical zone (POZ) having a POZ diameter, a normal to a surface of the POZ passing through a center of the POZ, and the same optical power of the lens corresponding to the POZ. Each of the lenses in a set additionally has at least five peripheral zones (PZs). Each of the PZs encircles the POZ and has corresponding inner and outer perimeters. The immediately adjacent peripheral PZs share a perimeter. Each of the five PZs has a corresponding optical power parameter that defines a slope of the posterior surface, corresponding to such PZ, with respect to the normal. Additionally, each lens of the set may be characterized by a first optical power parameter corresponding to an inner PZ that adjoins the POZ, and a second optical power parameter corresponding to an outer PZ (which has the largest outer perimeter among the present PZs). Such first and second optical power parameters have opposite signs and are the same for all lenses of the set. Each of the first and second optical power parameters represents a difference between an optical power of the lens in a respectively corresponding PZ and the optical power of the lens corresponding to its POZ.

In a specific embodiment, the annular peripheral PZs of a lens have equal widths. Each of the lenses in a set optionally additionally has optical power parameters respectively corresponding to intermediate PZs of such lens that are disposed between the first and second PZs and that have progressively larger outer perimeters. Each of the intermediate power parameters represents a difference between an optical power of the lens in a respectively corresponding intermediate PZ and the optical power of the lens corresponding to its POZ. In a specific case, the intermediate optical power parameters of the PZs, of a lens, form a set of ascending values which, optionally, differ from one another by a constant. Alternatively or in addition, all lenses in the set have the same lens diameter and a POZ diameter. A related embodiment provides a method of using such a contact lens from the set of contact lenses, that includes receiving the contact lens and fitting it to an eye.

Embodiments of the invention additionally provide an apparatus for generating parameters of a set of contact lenses that each of which has a substantially circular posterior optical zone (POZ) and an optical power corresponding to the POZ, and at least three annular peripheral zones (PZs) each of which PZs encircles said POZ and has corresponding inner and outer perimeters and a width such that the immediately adjacent annular PZs share a perimeter. The provided apparatus includes an input configured to receive imaging data acquired as a result of imaging an eye; and a processor configured to receive the imaging data from the input, to receive data base associated with imaging an eye, and to generate a representation of the set of contact lenses based on the received imaging data and data base. The representation of the set of lenses generated by the processor includes at least one optical power parameter corresponding to a PZ and representing a difference between an optical power of the lens in such PZ and the optical power of the lens corresponding to the POZ. In a specific case, at least one optical power parameter is determined based on the data base and, optionally, includes (i) a first optical power parameter corresponding to a first PZ that adjoins the POZ; (ii) a second optical power parameter corresponding to a second PZ that has the largest outer perimeter among all of the PZs of the lens; and (iii) a third optical power parameter corresponding to a third PZ that is interposed between the first and second PZs. Optionally, the first and second optical power parameters have opposite signs. The imaging data may include data representing at least one of optical power of a cornea and type of corneal astigmatism and/or the data base includes data representing contact lenses successfully fitted to eyes of patients.

An embodiment of the apparatus may additionally include a tangible computer-readable non-transient storage medium having at least one of the imaging data and data base stored thereon and, in a specific implementation, a display operably connected to the processor and configured to generate at least one of the image of the eye and the representation of the set of contact lenses.

Embodiments of the invention also provide a method for determining parameters of a set of contact lenses. Such method contains the steps of (i) receiving imaging data representing an eye; (ii) determining an optical parameter of a central portion of a lens of the set to correct a deviation of an optical characteristic of the eye from a corresponding optical characteristic of a normal eye; and (iii) defining an optical power parameter corresponding to an annular peripheral zone (PZ) of the lens that encircles the central portion of the lens, where such optical parameter represents a difference between an optical power of the lens in the PZ and an optical power of the lens in the central portion. The step of defining an optical power includes, in one embodiment, defining an optical power parameter representing an inclination of a posterior surface of the lens across the PZs with respect to a posterior surface of the lens in its central portion. In a specific implementation, such defining is done based on an empirically acquired data base. Alternatively or in addition, the step of defining an optical power includes defining at least three optical power parameters respectively corresponding to such first, second, and third annular PZs that encircle the central portion of the lens and has corresponding inner and outer perimeters and a width, and that immediately adjacent annular PZs share a perimeter. A method may further include a step of calculating a geometrical parameter of the lens based on the defined optical power parameter, where the calculation optionally includes calculating a parameter representing a curvature of a posterior surface of the lens.

Furthermore, embodiments of the invention provide a method for determining a curvature of a posterior surface of a contact lens, which method includes receiving input data representing the contact lens that has a substantially circular central portion and an annular peripheral zone (PZ) encircling such central portion. The input data includes an optical power parameter corresponding to the PZ. The method additionally includes calculating a geometrical parameter associated with the curvature of the posterior surface of the contact lens based on said input data. Optionally, the receiving of the input data includes receiving input data containing an optical power parameter, which optical parameter represents a difference between an optical power of the lens in the corresponding PZ and the optical power of the lens in the central portion of the lens.

BRIEF DESCRIPTION OF THE DRAWINGS

The invention will be more fully understood by referring to the following Detailed Description in conjunction with the Drawings, of which:

FIGS. 3A, 3B, 3C, 3D, 3E, 3F, 3G and 3H summarize data characterizing contact lenses according to several embodiments of the invention.

Figure 1A:
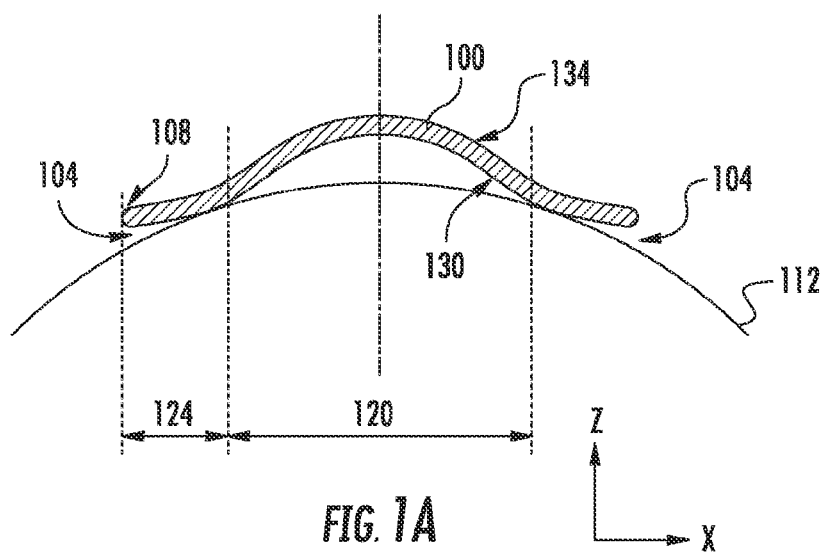
FIG. 1A is a cross-sectional diagram showing cooperation between a typical contact lens and a cornea.

In the drawings like numbers are used to represent the same or similar elements wherever possible. The depicted structural elements are generally not to scale. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise.

DETAILED DESCRIPTION

The implementation of the present invention facilitates at least a reduction or even substantial elimination of devising and producing customized contact lenses, and can be applied to the design, fabrication, and fitting of at least rigid contact lenses.

Seldom are the surfaces of human corneas spherical. Instead, these surfaces flatten at varying and unpredictable rates from the center of the cornea to its periphery. The fit of contact lenses that rest entirely on the cornea and that should have freedom to slide along the cornea's surface with each blink of an eye, must take the corneal shape into account. To avoid traumatization of the cornea with an edge of the contact lens and to facilitate the movement of the contact lens along the eye's surface, a peripheral or edge region of a typical contact lens that is in contact with the cornea is made flatter than the contact lens's central, optical portion covering an iris of an eye.

The shape of a normal cornea can be described as a prolate ellipse. This means that the steepest radius of curvature is central or apical. In the direction from the apex of the cornea to the limbus, the corneal curvature progressively flattens. This prolate or progressively flattening cornea is characteristic of most normal, nonsurgical corneas.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The invention as recited in claims appended to this disclosure is intended to be assessed in light of the disclosure as a whole, including features disclosed in prior art to which reference is made.

Figure 1B:
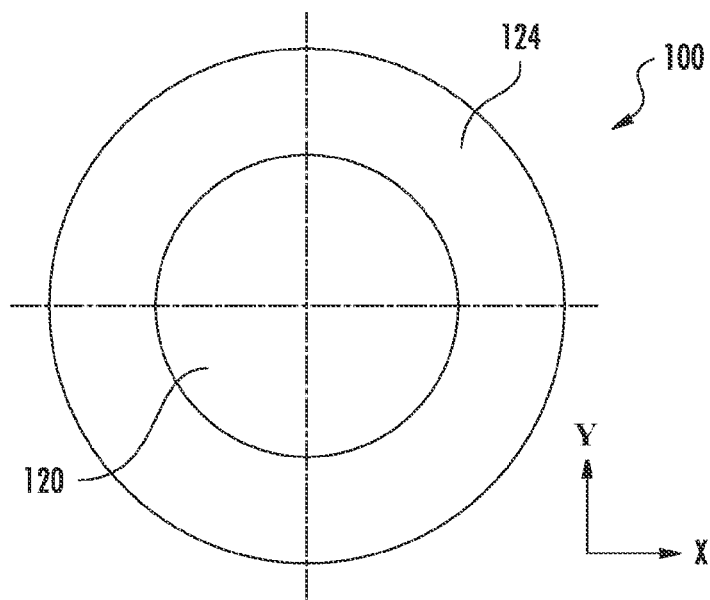
FIG. 1B is a front view of a contact lens denoting optical and peripheral portions of a contact lens.

In reference to FIG. 1A, showing diagrammatically in a cross-sectional view a contact lens cooperated with a cornea, an essential characteristic of a contact lens 100 design is the definition and formation of a space 104 between an edge 108 of the lens 100 and the underlying cornea 112. This space is often referred to as edge clearance or edge lift. Although the edge lift 104 must be sufficient to keep the edge 108 of the contact lens 100 above the surface of the cornea 112 during lens movement, the edge lift 104 should also be as small as possible to avoid irritating the edge of the upper eye-lid so it slides over the edge of the lens during the closing phase of a blink. In reference to FIG. 1B, showing schematically the contact lens 100 in front view, the dimensions of the central, optical portion 120 of the lens 100 and the dimensions of the ring-like peripheral zone or portion 124 (which, in practice, has to be fitted to an eye of a patient), as well as the position of the contact lens 100 relative to the cornea 112 and the clinically desirable edge clearance 104 should be also considered for the wearer's comfort.

In further reference to FIG. 1A, both the optical portion 120 and the peripheral fitting portion 124 of the contact lens 100 should be preferably tailored to the topography of the individual cornea 112. An approach to determining patient-dependent contact lens-parameters includes (i) defining a shape of the posterior surface 130 of the contact lens 100 by relating this posterior surface to reference curve(s) that represent a surface of the individual patient's cornea and (ii) defining reference points that have specific clearance values with respect to the reference curve(s).

In particular, clinical observations of the individual patient's eye include, among others, the measurements of corneal curvatures in a plurality of directions (for example, in two orthogonal directions to determine the flatter and the steeper profiles of the cornea and, therefore, the corneal astigmatism), of the orientation of corneal astigmatic axes, of corneal abnormal protrusion if any, and of the iris size. It is with respect to a reference geometrical descriptor of an eye (such as a reference line or surface, for example) associated with at least one clinically-measured ophthalmological parameter (referred to hereinafter as a reference ophthalmological parameter) that a curvature of the posterior surface of the contact lens in the central portion of the contact lens is then usually determined.

The methodology may additionally include the use of spline approximation to generate (typically, with the use of a computer processor) a description or map of the posterior surface 130 of the contact lens 100 which, when fitted to the corneal surface, is expected to have the edge clearance or edge lift 104 of a desired value. A front, exterior surface 134 of the contact lens 100 can be defined in a specified reference relationship to its posterior surface 130.

In the sense that implementations of a contact lens are designed to mimic or emulate the characteristics of the individual cornea measured by the ophthalmologists, the clinical utility and, ultimately, clinical acceptance of the manufactured contact lens are predicated on the accuracy of this emulation. The general framework of an approach to design and manufacture of a contact lens is largely customized and is based on ophthalmological parameters describing an eye of a particular patient. Inevitably, therefore, the particulars of the contact lens design and manufacture have to be adjusted, modified, and/or refined from patient to patient. For example, an adjustment of an edge clearance value may be carried out based on a practitioner's decision to modify the shape of the posterior surface (PS) 130 in the peripheral zone 124. This is done either at a step of defining the reference points of the peripheral portion of the posterior surface 130 prior to generating the spline approximation or at a step following the manufacture of the contact lens, when the fitting of the lens is not satisfactory and the refinements of the design is required.

While a well-trained practitioner can arrive at a correct decision about the contact lens refinement as a result of fitting the lens to a cornea of a particular patient, such individualized and customized approach and refinement of the contact lens parameters necessitate higher cost and lower efficiency of processes of the contact lens design, manufacture, and lens-to-eye fitting. Moreover, the customized approach by its very nature does not allow the processes of contact lens-manufacture and contact lens-fitting to be optimized to ensure that the edge lift is reproducible from one contact lens to another contact lens. The customized methodology, therefore, is bound not only to utilize a practically limitless number of customized designs to effectuate the manufacture of contact lenses that would be similar to one another in terms of fitting to the eyes, but to be undergo re-adjustment and re-design when the fitting of a manufactured contact lens is not satisfactory. A deficiency of the customized approach, therefore, lies in its inability to quantitatively and reliably generalize repeatably-used design, manufacture, and fitting of the contact lenses for patient's eyes that have similar corneal topologies.

In contradistinction to the above, the present idea facilitates the reduction or even substantial elimination of the need for customized contact lenses. Only a pre-determined number of target contact-lens designs is required to satisfy needs of patients having statistically typical corneal characteristics. Such pre-determined number of target designs is defined based on empirically acquired data base, containing parameters of numerous individually-fit contact lenses, which is mapped into a discrete set of optical parameters defining posterior surfaces of the target designs, and the following reliable fitting of the manufactured fitting contact lenses to numerous patients having similar corneal characteristics. Lenses in such fitting set(s) or series have consistent fitting characteristics over the range of optical parameters representing optical corrections of the series. The terms "set" and "series" as used herein are to denote a collection, each member of which is adapted for a special use in a particular operation, or, alternatively or in addition, a number, group, or combination of things of similar nature, design, and/or function. When used in connection with a specified value or number, the term "about" is used to denote a value that is close to, near, or approximately equal to the specified value, and the difference between which and the specified value is typically defined by an experimental error in measuring the value using methods conventionally used for such measurements, as understood by a person of skill in the art. For example, the reference to an optical power of an optical element as being about 3.0 diopters includes the values of the optical power that are either equal to 3.0 diopters or, being in the vicinity of 3.0 diopters, differ from it by a typical experimental error (in one example, by 5%) as recognized by a skilled artisan.

Embodiments of the present invention can be applied to the design, fabrication, and fitting of at least rigid contact lenses.

A target lens-defining process includes matching the sagittal height of the lens to the sagittal height of the cornea to ensure that a shape of the lens approximates the shape of the cornea, while providing an adequate apical clearance. Determination of peripheral alignment (curve or angle) is carried out to produce good centration, comfort and physiological response. In addition and contradistinction with related art, however, a set of fitting peripheral-alignment parameters is defined based on empirical data base that represents optical and geometrical characteristics of contact lenses that have been successfully fitted to peripheral regions of patients' corneas having different ophthalmological characteristics. It was empirically verified that contact lenses fabricated according to a judiciously determined target designs based of empirical data base satisfactorily fits, on average, a statistically significant majority of the patients' corneas. (The data base may be stored, for example, on a tangible storage medium in the system and processed with the use of an appropriately programmed computer processor.) The empirical data base is understood to include, as discussed below, at least a description of a flatter corneal meridian, a parameter describing a posterior optical zone of the lens, a base curve of the lens, a measure of asphericity of the contact lens, and optionally include additional parameters such as, for example, central thickness and edge thickness parameters. Target designs are understood to include a discrete number of contact lens designs describing a shape of peripheral zones of a lens in terms of optical power parameters.

A sub-set of data base giving rise to parameters of a target set of fitting lenses is determined by incrementally sampling the data base with respect to at least a profile of the posterior surface in the peripheral portion of a lens. In other words, the space of geometrical parameters representing steepness (or flatness) of the peripheral portion of a contact lens with respect to the cornea is mapped to related optical parameters (such as, for example, differences between optical power of the lens at its peripheral portion and optical power of the lens at its central portion) at predetermined increments to arrive at a set of contact lenses that otherwise have similar characteristics (such as optical correction provided in the central optical zone of the lens, or apical clearance, to name just a few). As a result, a set of optical power profiles of peripheral portions of the contact lenses is defined that provides for the peripheral portions of lenses inclined at different angles with respect to a chosen axis (for example, with respect to a normal to the posterior surface passing through the center of the contact lens). Steepness (or, alternatively, flatness) of the peripheral portions of the resulting set of contact lenses with respect to the chosen axis is determined, therefore, based on the data base such as to ensure that at least one contact lens from the target set of contact lenses will satisfactorily fit a cornea in question.

Based on the measurement(s) of ophthalmological characteristics that include at least one of (i) flatter and steeper corneal meridians FK, SK (expressed, for example, in units of optical power and defining a degree of corneal astigmatism $\Delta K$); (ii) a type of corneal astigmatism (related to, for example, orientation of astigmatic axes); (iii) dimension(s) of an iris; and (iv) a degree of apical steepening, in units of optical power, main parameters of a target set of contact lenses are determined. In reference to Table 1, the ophthalmological parameters listed include FK, and the main lens parameters include at least one of a "Sphere" (denoted as "S" and representing an optical power of the lens in its central portion, in diopters), a "Base Curve" (abbreviated as "BC" and representing, in millimeters, a radius of the sphere of the posterior surface of the lens, in relation to a flatter meridian of the cornea) or a Central Posterior Curve (or "CPC", effectively expressing the "BC" value in units of optical power); eccentricity (or "Ecc", a measure of asphericity of the contact lens); a diameter of the contact lens "Dia"; a Posterior Optical Zone "POZ", related to a geometrical extent of the central optical portion of the lens; a center thickness "CT" of the lens along its optical axis at the lens center; and an edge thickness "ET" of the lens. Identifiers M1, L1 through L8, P1 through P5, and W1 through W5 represent values of corresponding parameters of Table 1.

TABLE 1

| Main Parameters of Lens | | | | | | | | | PZ Transitions | | | | | PZ Widths | | | | |
|---|---|---|---|---|---|---|---|---|---|---|---|---|---|---|---|---|---|---|
| FK | S | Cyl | Ax | BC | Ecc | Dia | POZ | CT | ET | PZ1 | PZ2 | PZ3 | PZ4 | PZ5 | PZ1 | PZ2 | PZ3 | PZ4 | PZ5 |
| M1 | L1 | L2 | L2 | L3 | L4 | L5 | L6 | L7 | L8 | P1 | P2 | P3 | P4 | P5 | W1 | W2 | W3 | W4 | W5 |

Figure 2A:
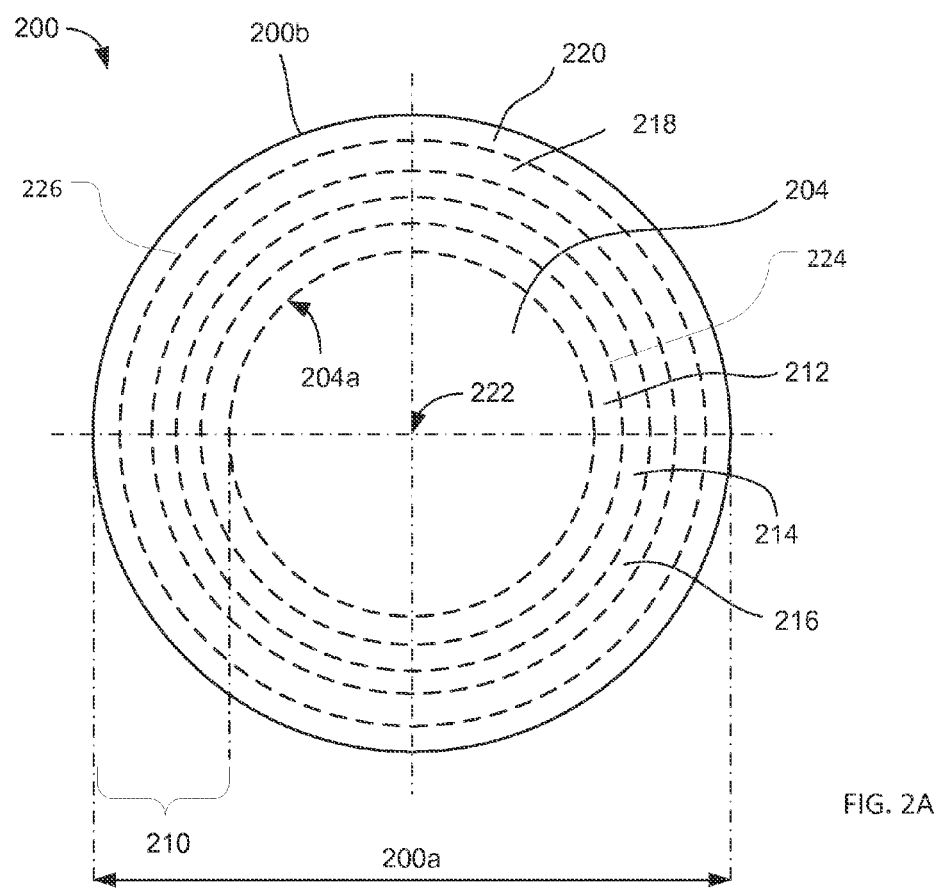
FIG. 2A is a diagram representing peripheral zones of a contact lens according to an embodiment of the invention.
Figure 2B:
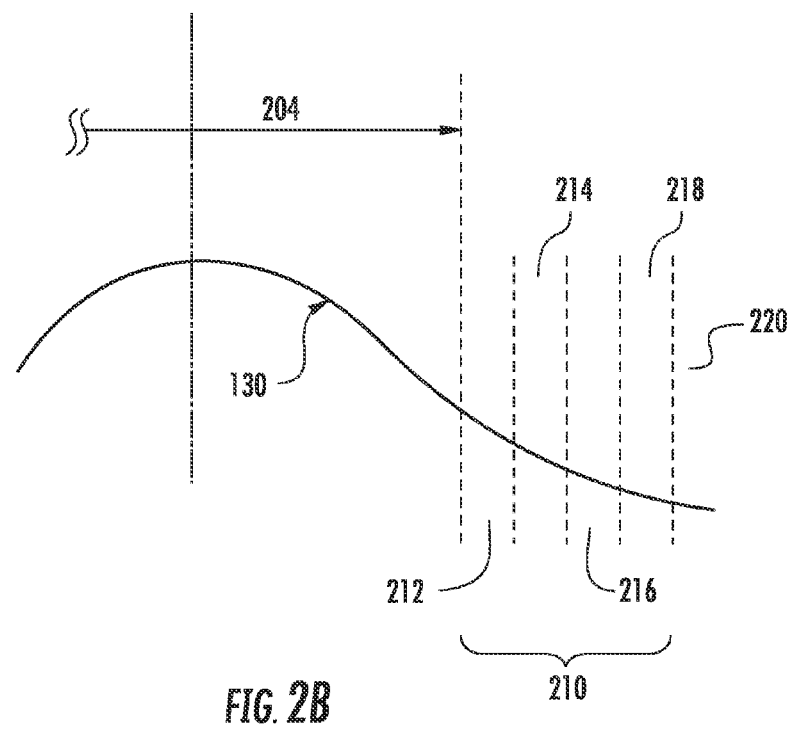
FIG. 2B is a diagram representing a profile of a posterior surface of the embodiment corresponding to FIG. 2A.

In reference to FIG. 2A, a lens 200 from the set of lenses configured according to an embodiment of the invention is schematically shown in top view. The outer perimeter of the lens 200, having a diameter 200a, is indicated by a line 200b. The extent of a POZ 204 is defined by a boundary 204a. The POZ 204 is encircled and adjoined by a peripheral region 210 that includes at least three peripheral zones (PZs). As shown, the peripheral region 210 contains five PZs 212, 214, 216, 218, and 220 (denoted as PZ1 through PZ5 in Table 1). Each of these PZs has inner and outer perimeters (defined with respect to a center 222 of the POZ 204), and the immediately adjacent PZs share a perimeter. For example, an inner perimeter of the innermost PZ 212 coincides with the boundary 204a of the POZ 204, while an outer perimeter 224 of the PZs 212 is, at the same time, an inner perimeter of the PZ 214. As a result, the PZ 214 adjoins the PZ 212 around the outer perimeter 224 of the PZ 212. The remaining PZs 216, 218, and 220 are spatially coordinated in a similar fashion. In particular, the outermost PZ 220 and the PZ 218, which is immediately adjacent and internal to the PZ 220, share a perimeter 226 that is an outer perimeter of the PZ 218 and an inner perimeter of the PZ 220. FIG. 2B supplements, in further reference to FIG. 1A, the description of the lens 200 by showing, in a cross-sectional view, a reverse curve profile of the posterior surface 130 of the lens 200. The posterior surface is, generally, aspherical (for example, elliptical) and, therefore, has a non-zero eccentricity about it, as discussed below. Accordingly, in the central region or POZ 204 of the lens, the posterior surface profile 130 is, generally, parabolic.

According to an embodiment of the invention, cross-sectional profiles of the PZs of the peripheral region 210 of the lens 200 are judiciously chosen to define optical power parameters (denoted as P1 through P5 in Table 1) that respectively correspond to the PZs. An optical power parameter of a particular PZ represents a difference between an optical power of the lens at that PZ and an optical power of the lens at the central portion of the lens (corresponding to the POZ 204). The optical power parameters of the PZs and transition points between the immediately adjacent PZs can be referenced, therefore, with respect to a flatter meridian of the cornea, for example, based on data base such as to ensure that a posterior surface of the lens 200 is a differentiable surface. A differentiable surface is defined as a surface a derivative of a profile of which can be defined at any surface point. Therefore, there are no visually perceivable boundaries associated with transitions between the PZs of the peripheral region 210 of an embodiment of the lens. The optical power parameters of innermost and outermost PZs have opposite signs. In reference to the embodiment 200, the optical power parameter of the innermost PZ 212 is negative, while the optical power parameter of the outermost PZ 220 is positive. The optical power parameters associated with the PZs of an embodiment of the contact lens of the invention are defined, based on the data base, in incremental fashion such as to form a set of values that ascend, starting from the value of optical power parameter associated with the innermost PZ and progressing towards the value of optical power parameter associated with the outermost PZ. In a related implementation, all of the PZs of the peripheral region 210 of the lens may have equal widths. FIGS. 3A, 3B, 3C, 3D, 3E, 3F, 3G and 3H referred to below provides examples of parameter sets defining posterior surfaces of lenses in terms of optical power parameters across the posterior surface, according to an embodiment of the invention.

Moreover, the data base is judiciously sampled to define parameters for a set of lenses each of which possesses characteristics described in reference to FIG. 2A and FIG. 2B. In particular, each of the lenses in a set of lenses includes a substantially circular posterior optical zone having a POZ-diameter and at least three annular peripheral zones, each of which encircles said POZ and has corresponding inner and outer perimeters and width. The optical power of a lens at the POZ is the same for every lens in the set of lenses. In a specific implementation, PZs of each of the lenses in the set are coaxial with respect to an optical axis of the corresponding lens and, alternatively or in addition, at least one of a lens diameter and a diameter of the POZ is common for all lenses in the set.

Referring further to a set of lenses defined based on the data base, in accordance with embodiment of the invention, immediately adjacent annular peripheral PZs of each of the lenses in the set share a perimeter and have respectively corresponding optical power parameters such that the optical power parameters of the innermost and outermost (with respect to a lens center) PZs have opposite signs. The value of optical power parameters of a PZ that is interposed between the innermost and outermost PZs has a sign opposite to that of the innermost PZ. It is appreciated that spatially "blending" the posterior surfaces of the PZs for lenses defined as described above with the use of, for example, spline data processing results in lenses having posterior surfaces that are differentiable. Furthermore, the values of optical power parameters are defined for the PZs (of lenses in the set of lenses) incrementally such as to ensure that posterior surfaces of the peripheral portions of the lens in the set are inclined at different angles with respect to corresponding optical axes of the lenses in the set. The result of so defining the set of lenses is that in practice the fitting of at least one of the lenses in the set to a given cornea is substantially ensured.

FIGS. 3A, 3B, 3C, 3D, 3E, 3F, 3G and 3H provide examples of target sets of lens parameters defined using the data base, according to an embodiment of the invention. As shown, FIGS. 3A, 3B, 3C, 3D, 3E, 3F, 3G and 3H include several sub-sets of contact lens parameters grouped, for ease of comprehension, according to a size of the central, optical zones of lens(es) denoted as "Lens (number1, number2)", where X.Y is a diameter of the central optical zone or portion in mm. For a set of lenses with the same diameter of the central optical zone, several sub-groups are determined (denoted as APS 1 through APS 5) that differ in degree of inclination of the peripheral portion of the lens with respect to the cornea as defined in terms of optical power parameters of the PZ1 through PZ5.

For each of the lenses (such as rigid gas permeable and/or hard contact lenses) in a set the material of choice is indicated (such as, for example, Fluoro Silicone Acrylate and Silicone Acrylate).

Figure 4:
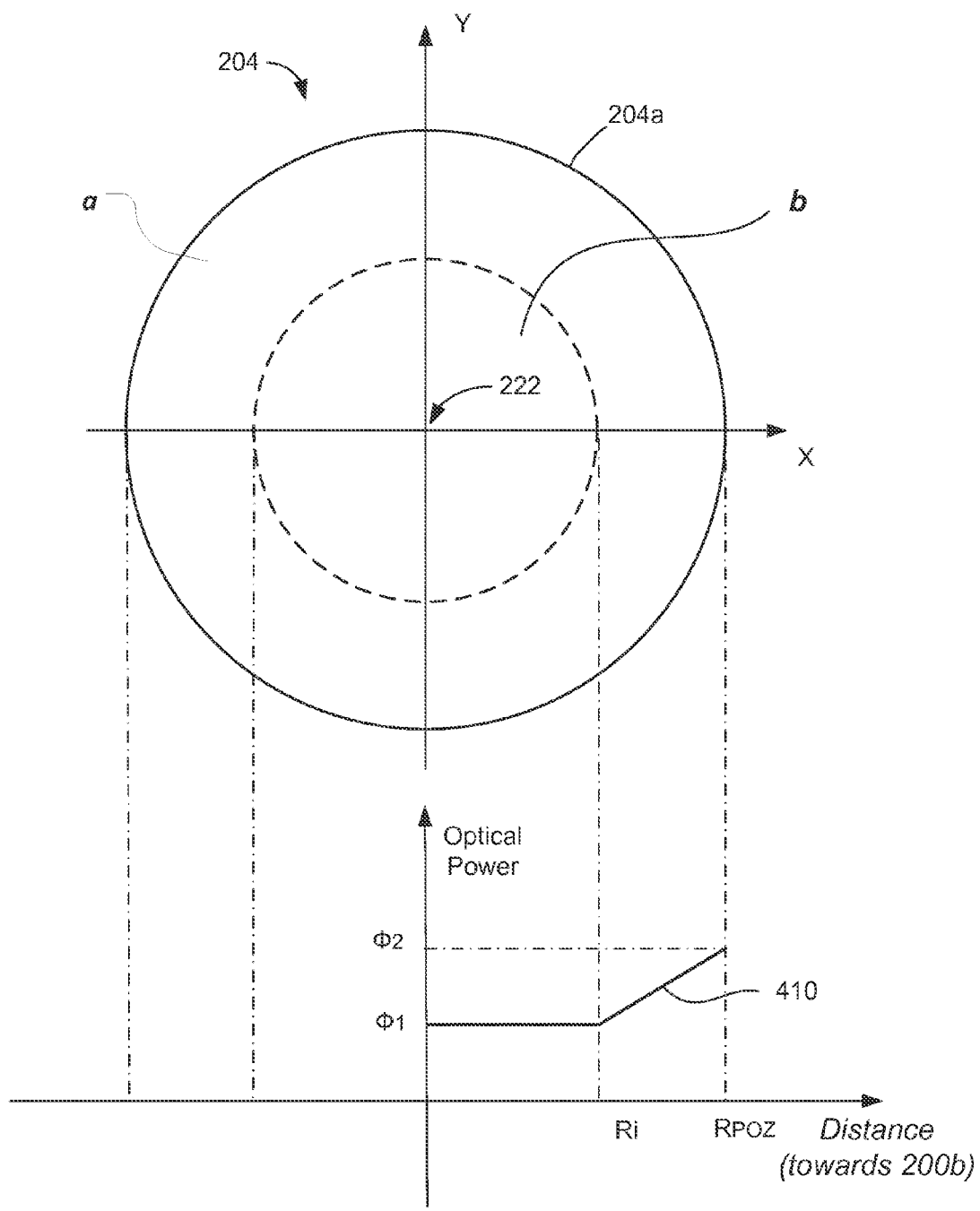
FIG. 4 is a diagram illustrating the variation of the optical power across the central optical portion of a lens in a multifocal embodiment of the invention.

If the lens is multifocal (or progressive, which is optional), additional multifocal parameters are defined for the lens that represent a change of optical power at least across the central optical portion of the lens. In one implementation and in reference to FIGS. 2A and 4, for example, an anterior surface of a lens is appropriately modified to ensure that an optical power of the central optical portion of the lens (i.e. the optical power corresponding to the POZ 204) varies, in a substantially continuous and monotonic fashion along the radius of the central optical portion between two pre-determined radial points one of which corresponds to an outer perimeter of the POZ 204 (line 204a) and another—to a radial point inside the perimeter 204a. As illustrated schematically in FIG. 4, for example (showing the positional dependence of the optical power $\Phi$ of a lens across its central optical portion or POZ 204), the optical power equals to $\Phi 1$ within a circle b of a radius Ri (Ri being smaller than the radius of the POZ 204) and radially changes outside this circle (across the annular region a) as shown with a curve 410 to reach the value of $\Phi 2$ at about the boundary of the POZ 204. The value of $\Phi 1$ generally corresponds to the specified, prescribed optical power of the lens (denoted as "Sphere" or "S" in Table 1), and the variation of this value across the region a leads to a multifocal (or progressive focal) characteristic of the lens. Generally, the value $\Phi 2$ may be greater than or smaller than the value $\Phi 1$. In one embodiment, the value $\Phi 1$ is negative (for example, about –2.0 diopters) and the value $\Phi 2$ is positive (for example, 0.75 diopters). A difference between the values of $\Phi 2$ and $\Phi 1$ defines an "add-on" value ?F of the optical power that a peripheral portion of the POZ 204 of the lens has in comparison with the center of the lens. A particular form of the radius-dependent variation of the optical power between the values of $\Phi 1$ and $\Phi 2$ may be linear (as shown in the specific example of FIG. 4), or, alternatively or in addition, sub-linear, or it may be an xy type dependence with a parameter y greater than one. For a given size of a central optical portion POZ 204 of the lens (i.e., for a given RPOZ, in reference to FIG. 4), both the Ri and the $\Delta\Phi$ values are chosen from the set of pre-determined values. In a given set of lenses, the values of Ri and $\Delta\Phi$ are not necessarily the same for the dominant and nondominant eyes. According to an embodiment of the invention, when the multifocal characteristics of a contact lens are specified, such specified combination of Ri and ?F values can be complemented with a parameter (referred to as an "Add" parameter) that represents an effective value of the optical power (in diopters) of the lens across the annular region a. Accordingly, a particular combination of Ri and $\Delta\Phi$ values is mapped to the Add parameter.

In one embodiment, a lens from the set of lenses has the following parameters: S=$\Phi1$ is about −3.0 diopters; BC is about 7.8-7.9 mm; Ecc is about 0.2; Dia is about 9.5 mm; POZ is about 6.5 mm; CT is about 0.14 mm; ET is about 0.11 mm. Multifocal characteristics of such lens for use with a dominant eye include Ri of about 3.1 mm; $\Delta\Phi$=($\Phi2$−S) of about 3.25 diopters; and Add value of about 2.25. In this case, a lens is configured as follows. Its posterior surface is shaped, in the peripheral zones, according to embodiments discussed in reference to FIGS. 1A through 2B, 3A through 3H, and Table 1. Its anterior surface is additionally modified, in the central optical zone, such that the optical power of the lens is about −3.0 diopters within the circle of radius R1 and is progressively radially increasing between the Ri and the edge of the central optical zone (by default, at RPOZ of 6.5 mm) to reach the value of $\Phi2$=$\Delta\Phi$+S=0.25 diopters. Multifocal characteristics of such lens for use with a nondominant (or recessive) eye include Ri of about 2.9 mm; $\Delta\Phi$ of about 3.25 diopters; and Add of about 2.25 diopters. For either lens (for use with either dominant or recessive eye), the PZ regions are characterized by optical power parameters of PZ1 of about −0.5; PZ2 of about 0.5; PZ3 of about 1.25; PZ4 of about 1.0$\Phi$; and PZ5 of about 2.5.

Tables 2 and 3 provide examples of sets of multifocal characteristics that lenses of embodiments of the invention are optionally configured to have. In Tables 2 and 3, the column labeled as "Refractive Add" contains values of the Add parameter discussed above; the column labeled "Actual Power (FOD)" contains ?F values; the column of "Eye Designation" specifies whether the eye for which the lens is adapted is dominant or recessive; and the column "DV Zone" sets up the Ri values. According to an embodiment of the invention reflected in Tables 2 and 3, for either the dominant or recessive eye and for given values of the prescribed optical power $\Phi1$ and diameter of the POZ, five pairs of (Ri, $\Delta\Phi$) values are defined such that each of these pairs translates or maps into a particular Add parameter. For example, and in further reference to FIG. 4 and Table 2, to achieve a progressive focal length profile (across the region a of the central optical portion of the lens) that corresponds to the Refractive Add value of about 2.00, an anterior surface of the dominant-eye lens is adapted such that the lens has one of the following: (Ri=about 2.8 mm; $\Delta\Phi$=about 3.75 diopters); (Ri=about 3.0 mm; $\Delta\Phi$=about 3.75 diopters); (Ri=about 3.0 mm; $\Delta\Phi$=about 3.50 diopters); (Ri=about 3.2 mm; $\Delta\Phi$=about 3.25 diopters); and (Ri=about 3.4 mm; $\Delta\Phi$=about 3.25 diopters). To achieve a similar profile of optical power distribution, a recessive-eye lens is adapted to have one of the following: (Ri=about 2.5 mm; $\Delta\Phi$=about 3.75 diopters); (Ri=about 2.7 mm; $\Delta\Phi$=about 3.75 diopters); (Ri=about 2.8 mm; $\Delta\Phi$=about 3.50 diopters); (Ri=about 2.9 mm; $\Delta\Phi$=about 3.25 diopters); and (Ri=about 3.0 mm; $\Delta\Phi$=about 3.25 diopters).

Method for determining or calculating parameters of a target set of contact lenses is based on processing data received by the practitioner and/or the apparatus used for such determination or calculation. In practice, the term "receiving data" means, for example, that the practitioner comes to possession of imaging data representing a patient's eye. Based on such received data, the practitioner then determines a set of optical parameters corresponding, as discussed above, to the central portions of lenses and their peripheral zones based on such imaging data. Alternatively or in addition, "receiving data" means that a practitioner comes to possession of data including optical parameters (corresponding to the central portions of lenses and their peripheral zones, as discussed above) that have been already determined. The practitioner can then, optionally, map such received data into another data representing geometrical characteristic(s) of lenses from the target set.

While the preferred embodiments of the present invention have been illustrated in detail, it should be apparent that modifications and adaptations to those embodiments may occur to one skilled in the art without departing from the scope of the present invention.

TABLE 2

| Refractive Add (labeled) | Actual Power (FOD) | Profile (label) | Profile | Eye Designation (labeled) | DV Zone |
|---|---|---|---|---|---|
| 0.75 | 1.50 | Decreased2 Dom | 1 | Dom | 3.4 |
| | 1.50 | Decreased1 Dom | 2 | Dom | 3.2 |
| | 1.75 | Standard Dom | 3 | Dom | 3.0 |
| | 2.00 | Increased1 Dom | 4 | Dom | 3.0 |
| | 2.00 | Increased2 Dom | 5 | Dom | 2.8 |
| | 1.50 | Decreased2 | 6 | Rec | 3.0 |
| | 1.50 | Decreased1 | 7 | Rec | 2.9 |
| | 1.75 | Standard | 8 | Rec | 2.8 |
| | 2.00 | Increased1 | 9 | Rec | 2.7 |
| | 2.00 | Increased2 | 10 | Rec | 2.5 |
| 1.00 | 1.75 | Decreased2 Dom | 1 | Dom | 3.4 |
| | 1.75 | Decreased1 Dom | 2 | Dom | 3.2 |
| | 2.00 | Standard Dom | 3 | Dom | 3.0 |
| | 2.25 | Increased1 Dom | 4 | Dom | 3.0 |
| | 2.25 | Increased2 Dom | 5 | Dom | 2.8 |
| | 1.75 | Decreased2 | 6 | Rec | 3.0 |
| | 1.75 | Decreased1 | 7 | Rec | 2.9 |
| | 2.00 | Standard | 8 | Rec | 2.8 |
| | 2.25 | Increased1 | 9 | Rec | 2.7 |
| | 2.25 | Increased2 | 10 | Rec | 2.5 |
| 1.25 | 2.00 | Decreased2 Dom | 1 | Dom | 3.4 |
| | 2.00 | Decreased1 Dom | 2 | Dom | 3.2 |
| | 2.25 | Standard Dom | 3 | Dom | 3.0 |
| | 2.50 | Increased1 Dom | 4 | Dom | 3.0 |
| | 2.50 | Increased2 Dom | 5 | Dom | 2.8 |

TABLE 2-continued

| Refractive Add (labeled) | Actual Power (FOD) | Profile (label) | Profile | Eye Designation (labeled) | DV Zone |
|---|---|---|---|---|---|
| | 2.00 | Decreased2 | 6 | Rec | 3.0 |
| | 2.00 | Decreased1 | 7 | Rec | 2.9 |
| | 2.25 | Standard | 8 | Rec | 2.8 |
| | 2.50 | Increased1 | 9 | Rec | 2.7 |
| | 2.50 | Increased2 | 10 | Rec | 2.5 |
| 1.50 | 2.50 | Decreased2 Dom | 1 | Dom | 3.4 |
| | 2.50 | Decreased1 Dom | 2 | Dom | 3.2 |
| | 2.75 | Standard Dom | 3 | Dom | 3.0 |
| | 3.00 | Increased1 Dom | 4 | Dom | 3.0 |
| | 3.00 | Increased2 Dom | 5 | Dom | 2.8 |
| | 2.50 | Decreased2 | 6 | Rec | 3.0 |
| | 2.50 | Decreased1 | 7 | Rec | 2.9 |
| | 2.75 | Standard | 8 | Rec | 2.8 |
| | 3.00 | Increased1 | 9 | Rec | 2.7 |
| 2.75 | 4.25 | Standard Dom | 3 | Dom | 3.0 |
| | 4.50 | Increased1 Dom | 4 | Dom | 3.0 |
| | 4.50 | Increased2 Dom | 5 | Dom | 2.8 |
| | 4.00 | Decreased2 | 6 | Rec | 3.0 |
| | 4.00 | Decreased1 | 7 | Rec | 2.9 |
| | 4.25 | Standard | 8 | Rec | 2.8 |
| | 4.50 | Increased1 | 9 | Rec | 2.7 |
| | 4.50 | Increased2 | 10 | Rec | 2.5 |
| 3.00 | 4.25 | Decreased2 Dom | 1 | Dom | 3.4 |
| | 4.25 | Decreased1 Dom | 2 | Dom | 3.2 |
| | 4.50 | Standard Dom | 3 | Dom | 3.0 |
| | 4.75 | Increased1 Dom | 4 | Dom | 3.0 |
| | 4.75 | Increased2 Dom | 5 | Dom | 2.8 |
| | 4.25 | Decreased2 | 6 | Rec | 3.0 |
| | 4.25 | Decreased1 | 7 | Rec | 2.9 |
| | 4.50 | Standard | 8 | Rec | 2.8 |
| | 4.75 | Increased1 | 9 | Rec | 2.7 |
| | 4.75 | Increased2 | 10 | Rec | 2.5 |

TABLE 3

| Refractive Add (labeled) | Actual Power (FOD) | Profile (label) | Profile | Eye Designation (labeled) | DV Zone |
|---|---|---|---|---|---|
| 0.75 | 1.25 | Decreased2 Dom | 1 | Dom | 3.6 |
| | 1.25 | Decreased1 Dom | 2 | Dom | 3.4 |
| | 1.50 | Standard Dom | 3 | Dom | 3.2 |
| | 1.75 | Increased1 Dom | 4 | Dom | 3.2 |
| | 1.75 | Increased2 Dom | 5 | Dom | 3.0 |
| | 1.25 | Decreased2 | 6 | Rec | 3.3 |
| | 1.25 | Decreased1 | 7 | Rec | 3.1 |
| | 1.50 | Standard | 8 | Rec | 2.9 |
| | 1.75 | Increased1 | 9 | Rec | 2.8 |
| | 1.75 | Increased2 | 10 | Rec | 2.7 |
| 1.00 | 1.50 | Decreased2 Dom | 1 | Dom | 3.6 |
| | 1.50 | Decreased1 Dom | 2 | Dom | 3.4 |
| | 1.75 | Standard Dom | 3 | Dom | 3.2 |
| | 2.00 | Increased1 Dom | 4 | Dom | 3.2 |
| | 2.00 | Increased2 Dom | 5 | Dom | 3.0 |
| | 1.50 | Decreased2 | 6 | Rec | 3.3 |
| | 1.50 | Decreased1 | 7 | Rec | 3.1 |
| | 1.75 | Standard | 8 | Rec | 2.9 |
| | 2.00 | Increased1 | 9 | Rec | 2.8 |
| | 2.00 | Increased2 | 10 | Rec | 2.7 |
| 1.25 | 1.75 | Decreased2 Dom | 1 | Dom | 3.6 |
| | 1.75 | Decreased1 Dom | 2 | Dom | 3.4 |
| | 2.00 | Standard Dom | 3 | Dom | 3.2 |
| | 2.25 | Increased1 Dom | 4 | Dom | 3.2 |
| | 2.25 | Increased2 Dom | 5 | Dom | 3.0 |
| | 1.75 | Decreased2 | 6 | Rec | 3.3 |
| | 1.75 | Decreased1 | 7 | Rec | 3.1 |
| | 2.00 | Standard | 8 | Rec | 2.9 |
| | 2.25 | Increased1 | 9 | Rec | 2.8 |
| | 2.25 | Increased2 | 10 | Rec | 2.7 |
| 1.50 | 2.25 | Decreased2 Dom | 1 | Dom | 3.6 |
| | 2.25 | Decreased1 Dom | 2 | Dom | 3.4 |
| | 2.50 | Standard Dom | 3 | Dom | 3.2 |
| | 2.75 | Increased1 Dom | 4 | Dom | 3.2 |
| | 2.75 | Increased2 Dom | 5 | Dom | 3.0 |
| | 2.25 | Decreased2 | 6 | Rec | 3.3 |

TABLE 3-continued

| Refractive Add (labeled) | Actual Power (FOD) | Profile (label) | Profile | Eye Designation (labeled) | DV Zone |
|---|---|---|---|---|---|
| | 2.25 | Decreased1 | 7 | Rec | 3.1 |
| | 2.50 | Standard | 8 | Rec | 2.9 |
| | 2.75 | Increased1 | 9 | Rec | 2.8 |
| 1.75 | 2.50 | Decreased2 Dom | 1 | Dom | 3.6 |
| | 2.50 | Decreased1 Dom | 2 | Dom | 3.4 |
| | 2.75 | Standard Dom | 3 | Dom | 3.2 |
| | 3.00 | Increased1 Dom | 4 | Dom | 3.2 |
| | 3.00 | Increased2 Dom | 5 | Dom | 3.0 |
| | 2.50 | Decreased2 | 6 | Rec | 3.3 |
| | 2.50 | Decreased1 | 7 | Rec | 3.1 |
| | 2.75 | Standard | 8 | Rec | 2.9 |
| | 3.00 | Increased1 | 9 | Rec | 2.8 |
| | 3.00 | Increased2 | 1 | Rec | 2.7 |
| 2.00 | 3.00 | Decreased2 Dom | 1 | Dom | 3.6 |
| | 3.00 | Decreased1 Dom | 2 | Dom | 3.4 |
| | 3.25 | Standard Dom | 3 | Dom | 3.2 |
| | 3.50 | Increased1 Dom | 4 | Dom | 3.2 |
| | 3.50 | Increased2 Dom | 5 | Dom | 3.0 |
| | 3.00 | Decreased2 | 6 | Rec | 3.3 |
| | 3.00 | Decreased1 | 7 | Rec | 3.1 |
| | 3.25 | Standard | 8 | Rec | 2.9 |
| | 3.50 | Increased1 | 9 | Rec | 2.8 |
| | 3.50 | Increased2 | 1 | Rec | 2.7 |
| 2.25 | 3.25 | Decreased2 Dom | 1 | Dom | 3.6 |
| | 3.25 | Decreased1 Dom | 2 | Dom | 3.4 |
| | 3.50 | Standard Dom | 3 | Dom | 3.2 |
| | 3.75 | Increased1 Dom | 4 | Dom | 3.2 |
| | 3.75 | Increased2 Dom | 5 | Dom | 3.0 |
| | 3.25 | Decreased2 | 6 | Rec | 3.3 |
| | 3.25 | Decreased1 | 7 | Rec | 3.1 |
| | 3.50 | Standard | 8 | Rec | 2.9 |
| | 3.75 | Increased1 | 9 | Rec | 2.8 |
| | 3.75 | Increased2 | 1 | Rec | 2.7 |
| 2.50 | 3.50 | Decreased2 Dom | 1 | Dom | 3.6 |
| | 3.50 | Decreased1 Dom | 2 | Dom | 3.4 |
| | 3.75 | Standard Dom | 3 | Dom | 3.2 |
| | 4.00 | Increased1 Dom | 4 | Dom | 3.2 |
| | 4.00 | Increased2 Dom | 5 | Dom | 3.0 |
| | 3.50 | Decreased2 | 6 | Rec | 3.3 |
| | 3.50 | Decreased1 | 7 | Rec | 3.1 |
| | 3.75 | Standard | 8 | Rec | 2.9 |
| | 4.00 | Increased1 | 9 | Rec | 2.8 |
| | 4.00 | Increased2 | 1 | Rec | 2.7 |
| 2.75 | 3.75 | Decreased2 Dom | 1 | Dom | 3.6 |
| | 3.75 | Decreased1 Dom | 2 | Dom | 3.4 |
| | 4.00 | Standard Dom | 3 | Dom | 3.2 |
| | 4.25 | Increased1 Dom | 4 | Dom | 3.2 |
| | 4.25 | Increased2 Dom | 5 | Dom | 3.0 |
| | 3.75 | Decreased2 | 6 | Rec | 3.3 |
| | 3.75 | Decreased1 | 7 | Rec | 3.1 |
| | 4.00 | Standard | 8 | Rec | 2.9 |
| | 4.25 | Increased1 | 9 | Rec | 2.8 |
| | 4.25 | Increased2 | 10 | Rec | 2.7 |
| 3.00 | 4.00 | Decreased2 Dom | 1 | Dom | 3.6 |
| | 4.00 | Decreased1 Dom | 2 | Dom | 3.4 |
| | 4.25 | Standard Dom | 3 | Dom | 3.2 |
| | 4.50 | Increased1 Dom | 4 | Dom | 3.2 |
| | 4.50 | Increased2 Dom | 5 | Dom | 3.0 |
| | 4.00 | Decreased2 | 6 | Rec | 3.3 |
| | 4.00 | Decreased1 | 7 | Rec | 3.1 |
| | 4.25 | Standard | 8 | Rec | 2.9 |
| | 4.50 | Increased1 | 9 | Rec | 2.8 |
| | 4.50 | Increased2 | 10 | Rec | 2.7 |

What is claimed is:

1. A set of contact lenses, each lens in the set comprising:
a differentiable posterior surface including a posterior optical zone (POZ) having a POZ diameter and a normal to a surface of the POZ passing through a center of the POZ;
at least five peripheral zones (PZs) each of which encircles said POZ and has corresponding inner and outer perimeters, wherein immediately adjacent peripheral PZs from said at least five annular PZs share a perimeter, the at least five PZs having respectively corresponding optical power parameters that define slopes of the posterior surface with respect to the normal; and
a POZ optical power of the lens corresponding to the POZ and common among the lenses in the set;
wherein the set of contact lenses comprises first and second lenses, each of the first and second lenses having a corresponding POZ optical power equal to about −3.0 diopters, a corresponding POZ diameter equal to about 6.5 mm, a lens diameter of about 9.0 mm, a base curve parameter of about 7.85, an eccentricity parameter of about 0.2, a center thickness of about 0.14 mm, and an edge thickness of about 0.11 mm;

wherein first, second, third, fourth, and fifth PZs have respective optical power parameters of about −0.5, 0.5, 1.25, and 2.50, the first PZ being immediately adjacent to the POZ, said first, second, third, fourth, and fifth PZ having progressively larger outer diameters;

wherein the first lens is adapted to have the POZ optical power of the first lens vary from about −3.0 diopters at a radius of about 3.1 mm from a center of the first lens to about 0.25 diopters at an edge of the POZ of the first lens; and wherein the second lens is adapted to have the POZ optical power of the second lens vary from about −3.0 diopter at a radius of about 2.9 mm from a center of the second lens to about 0.25 diopters at an edge of the POZ of the second lens.

2. A set of lenses according to claim 1,
wherein, for each lens of the set,
first and second optical power parameters, from the respective optical power parameters, have opposite signs and are common among the lenses of the set,
the first optical power parameter corresponding to an inner PZ from the at least five annular PZs, the inner PZ adjoining the POZ;
the second optical power parameter corresponding to an outer PZ from the at least five annular PZs, the outer PZ having the largest outer perimeter among the at least five PZ,
and
wherein each of the first and second optical power parameters represents a difference between an optical power of the lens in a respectively corresponding PZ and said POZ optical power of the lens.

3. A set of contact lenses according to claim 1, wherein the at least five annular peripheral PZs have equal widths.

4. A set of contact lenses according to claim 1, wherein, for each lens in the set,
an optical power parameter represents a difference between an optical power of the lens in a respectively corresponding PZ and said POZ optical power of the lens.

5. A set of contact lenses according to claim 4, wherein optical power parameters of the at least five PZs form a set of ascending values starting with an optical power parameter corresponding to the first PZ.

6. A set of contact lenses according to claim 1, wherein at least one of a lens diameter value and a diameter of the POZ value is the same for all lenses in the set.

7. A method for using a contact lens from the set of contact lenses according to claim 1, the method comprising receiving said contact lens and fitting said contact lens to an eye.

8. An apparatus for generating parameters of a set of contact lenses, the apparatus comprising:
an input located to acquire imaging data obtained as a result of imaging an eye; and
a processor programmed to receive the imaging data from the input, receive data base associated with imaging an eye, and generate a representation of the set of contact lenses based on said imaging data and data base,
wherein a lens from the set of contact lenses has a circular posterior optical zone (POZ) and an optical power corresponding to the POZ, and at least three annular peripheral zones (PZs) each of which encircles said POZ and has corresponding inner and outer perimeters and width,
wherein immediately adjacent annular PZs from said at least three annular PZs share a perimeter; and
wherein the representation includes at least one optical power parameter corresponding to a PZ from the at least three annular PZs, said at least one optical parameter representing a difference between an optical power of the lens in said PZ from the at least three annular PZs and the optical power of the lens corresponding to the POZ.

9. An apparatus according to claim 8, wherein the at least one optical power parameter is determined based on the data base.

10. An apparatus according to claim 8, wherein the at least one optical power parameter includes
a first optical power parameter corresponding to a first PZ from the at least three annular PZs, the first PZ adjoining the POZ;
a second optical power parameter corresponding to a second PZ from the at least three annular PZs, the second PZ having the largest outer perimeter among the at least three PZ; and
a third optical power parameter corresponding to a third PZ from the at least three annular PZs, the third PZ interposed between the first and second PZs.

11. An apparatus according to claim 10, wherein the first and second optical power parameters have opposite signs.

12. An apparatus according to claim 8, wherein the imaging data include data representing at least one of optical power of a cornea and type of corneal astigmatism.

13. An apparatus according to claim 8, wherein the data base includes data representing contact lenses successfully fitted to eyes of patients.

* * * * *